(12) United States Patent
Langejürgen

(10) Patent No.: US 8,483,848 B2
(45) Date of Patent: Jul. 9, 2013

(54) ELECTRICAL DEVICE ARRANGEMENT, IN PARTICULAR FOR AN ITEM OF FURNITURE, WITH A BUS DEVICE AND BUS SUBSCRIBERS, AND A METHOD FOR CONTROLLING SUCH ELECTRICAL DEVICE ARRANGEMENT

(75) Inventor: Stefan Langejürgen, Vlotho (DE)

(73) Assignee: DewertOkin GmbH, Kirchlengern (DE)

( * ) Notice: Subject to any disclaimer, the term of this patent is extended or adjusted under 35 U.S.C. 154(b) by 1334 days.

(21) Appl. No.: 12/093,871

(22) PCT Filed: Nov. 15, 2006

(86) PCT No.: PCT/EP2006/068517
§ 371 (c)(1),
(2), (4) Date: May 15, 2008

(87) PCT Pub. No.: WO2007/057420
PCT Pub. Date: May 24, 2007

(65) Prior Publication Data
US 2008/0291046 A1    Nov. 27, 2008

(30) Foreign Application Priority Data

Nov. 15, 2005   (DE) .......................... 10 2005 054 845

(51) Int. Cl.
*G06F 19/00*   (2006.01)
*A61G 5/00*    (2006.01)

(52) U.S. Cl.
USPC ..................................... 700/9; 700/19; 5/600

(58) Field of Classification Search
USPC ................... 700/9, 19, 20; 340/12.32; 5/600, 5/81.1 R
See application file for complete search history.

(56) References Cited

U.S. PATENT DOCUMENTS

| | | | |
|---|---|---|---|
| 5,289,176 A | 2/1994 | Novakovich et al. | |
| 5,430,430 A | 7/1995 | Gilbert | |
| 6,111,509 A * | 8/2000 | Holmes | 340/573.4 |
| 6,259,355 B1* | 7/2001 | Chaco et al. | 340/286.07 |
| 6,489,693 B1* | 12/2002 | Hetzler | 307/10.1 |
| 6,557,062 B1* | 4/2003 | Shaler et al. | 710/110 |
| 6,721,672 B2* | 4/2004 | Spitaels et al. | 702/62 |

(Continued)

FOREIGN PATENT DOCUMENTS

| | | |
|---|---|---|
| DE | 201 07 726 | 10/2001 |
| EP | 0 746 950 | 7/2002 |

OTHER PUBLICATIONS

Sven Linnman: "M3S: The Local Network for Electric Wheelchairs and Rehabilitation Equipment", in: IEEE Transactions on Rehabilitation Engineering, vol. 4, No. 3, Sep. 1996.

(Continued)

*Primary Examiner* — Charles Kasenge
(74) *Attorney, Agent, or Firm* — Henry M. Feiereisen LLC

(57) ABSTRACT

An electrical device arrangement, in particular for an item of furniture, includes a bus device and bus subscribers. The bus device has at least two control paths, two power paths and at least one enable path. The additional enable path simplifies the mutual identification of the bus subscribers and also improves the so-called first fail-safety. The signals carried on the enable path furthermore allow a safe shutdown of the system and provide a power-saving sleep mode. A method for controlling such an electrical device arrangement, in particular for an item of furniture, having a bus device and bus subscribers is also disclosed.

22 Claims, 3 Drawing Sheets

U.S. PATENT DOCUMENTS

| | | | |
|---|---|---|---|
| 6,784,797 B2* | 8/2004 | Smith et al. | 340/573.4 |
| 6,934,137 B2* | 8/2005 | Elliott et al. | 361/62 |
| 7,099,784 B2* | 8/2006 | Spitaels et al. | 702/57 |
| 7,231,283 B2* | 6/2007 | Maier | 700/291 |
| 7,883,478 B2* | 2/2011 | Skinner et al. | 600/595 |
| 7,890,229 B2* | 2/2011 | Huebl | 701/36 |
| 2002/0153776 A1* | 10/2002 | Elliott et al. | 307/38 |
| 2002/0181405 A1* | 12/2002 | Ying | 370/245 |
| 2003/0097521 A1* | 5/2003 | Pfandler et al. | 711/103 |
| 2003/0098661 A1* | 5/2003 | Stewart-Smith | 318/445 |
| 2003/0125886 A1* | 7/2003 | Spitaels et al. | 702/62 |
| 2004/0145500 A1* | 7/2004 | Huebl | 340/994 |
| 2004/0167732 A1* | 8/2004 | Spitaels et al. | 702/62 |
| 2005/0055585 A1* | 3/2005 | Maier | 713/300 |
| 2005/0283285 A1* | 12/2005 | Ying | 701/29 |

OTHER PUBLICATIONS

International Search Report issued in International application PCT/EP2006/068517.

German Search Report issued in German patent application DR 10 2005 054 845.8.

* cited by examiner

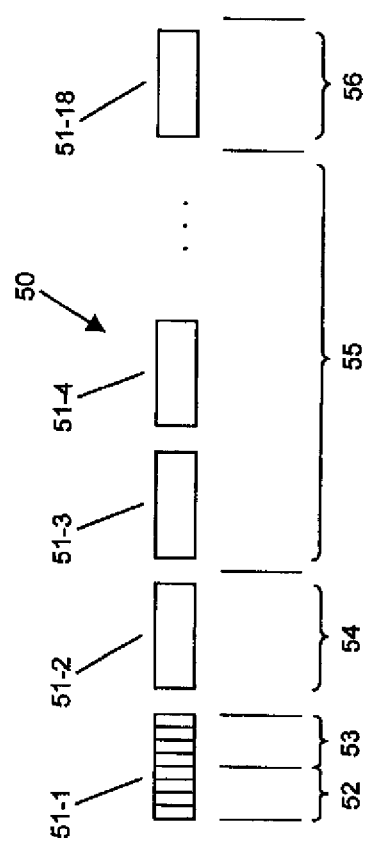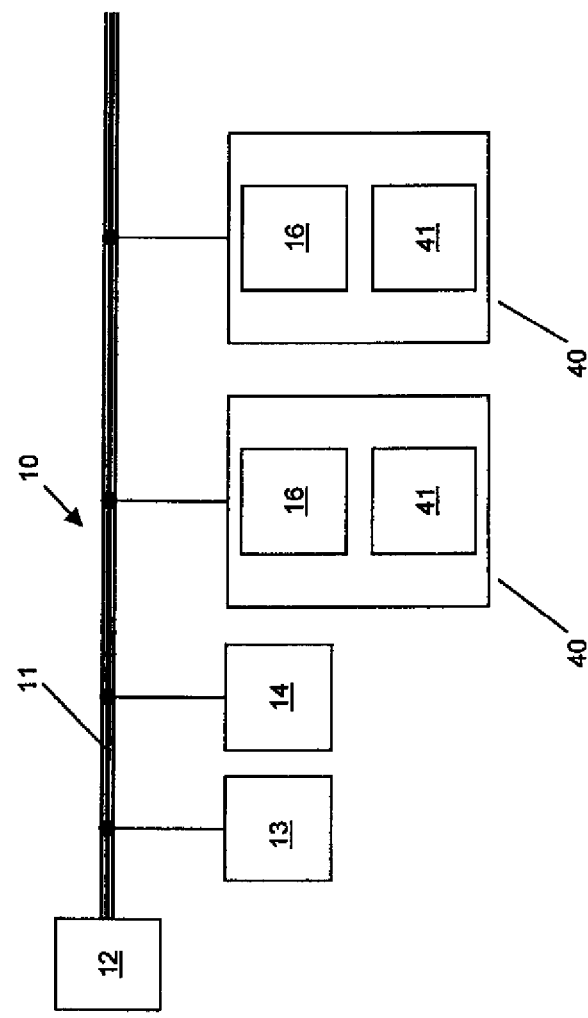

ELECTRICAL DEVICE ARRANGEMENT, IN PARTICULAR FOR AN ITEM OF FURNITURE, WITH A BUS DEVICE AND BUS SUBSCRIBERS, AND A METHOD FOR CONTROLLING SUCH ELECTRICAL DEVICE ARRANGEMENT

BACKGROUND OF THE INVENTION

The invention relates to an electrical device arrangement, in particular for an item of furniture, with a bus device and bus subscribers.

Such electrical arrangements are known in form of different electric-motor-driven drive configurations for adjusting items of furniture in the context of additional electrical loads, such as lamps, heaters, massagers, and the like. Because of the large variety in furniture design, these devices are configurable in many configurations. A large number of associated control units with power supplies, operating units and various connection designs is also available for the units to be connected.

Different standardizing measures are known, which not only reduce the variety of connection types, but also tend to add flexibility to the electric device arrangements, for example for upgrades and ease of assembly.

One such example is illustrated in DE 201 07 726 U1, which describes a device for controlling electrical devices of furniture in modular construction, wherein the modules can be plugged together and have data transmission lines and power supply lines. The data transmission lines form a bus system to which data processing devices are connected inside the individual modules. The modules also include control circuits for loads, and an operating unit can be connected to at least one module, or one module includes a remote control receiver.

There is a need to further simplify such arrangements and to add flexibility for connecting and controlling additional devices.

There is also a need to employ such electrical device arrangements also with items of furniture in areas subject to particular safety requirements, for example in nursing home and hospital settings.

SUMMARY OF THE INVENTION

It is therefore an object of the present invention to improve an electrical device arrangement, in particular for items of furniture, with a bus device and bus subscribers, and to improve over the state-of-the-art with respect to economy and safety.

The object is attained according to one aspect of the invention by an electrical device arrangement, in particular for an item of furniture, including a bus device and bus subscribers, wherein the bus device has at least two control paths, two power paths and at least one enable path.

According to another aspect of the invention, a method for controlling such electrical device arrangement, in particular for an item of furniture, with a bus device and bus subscribers, includes the steps of operating the input unit of a bus subscriber used as operating unit; classifying this bus subscriber by way of an enable path as a bus subscriber with master function or as an additional bus subscriber; and controlling the particular bus subscriber addressed by the input unit.

Advantageous embodiments and modifications of the invention are recited in the dependent claims.

The invention is based on the concept that all bus subscribers connected via a bus device are, in addition to the bus lines, connected with an enable line, and that all adhere to the parameter choice from a bus subscriber functioning as a master, wherein the master stores the control parameters in addition to a sequence program. The bus subscribers can recognize each other, address each other fully automatically, and communicate with each other.

The electrical device arrangement of the invention, in particular for an item of furniture, with a bus device and bus subscribers is characterized in that the bus device has at least two control paths, two power paths and at least one enable path.

Implementing the additional enable path advantageously simplifies mutual identification of the bus subscribers. The enable path also provides or simplifies the possibility of so-called first fail-safety required with certain safety standards, allowing a large number of applications. The enable path has the additional advantage that the signals traveling on the enable path are only used the for network clearing or a sleep mode, thus allowing to reduce energy consumption when not in use.

In a first embodiment, the bus device includes at least one daisy-chain-path in form of a line. This advantageously simplifies even further the mutual identification of the bus subscribers. In addition, the enable path and the daisy-chain path can be combined into a single path. Several signals are hereby applied to the common path, wherein the common path has a first signal for the daisy-chain-linking and at least one additional signal in form of an enable signal. Advantageously, the form and/or the magnitude of the signals can be different. For example, a first signal for the daisy-chain-linking may be formed by an encoded signal, whereas the at least one enable signal is formed by at least one signal having a constant voltage, although the various voltage signals may have different amplitudes.

In a preferred embodiment, each subscriber includes at least one control unit, a basic control unit, a memory unit, and an output unit and/or an input unit. With this approach, all bus subscribers can be economically equipped with the same software. For example, this approach significantly simplifies synchronization of subscribers, or of drives configured as drives or as control units of the drives.

Advantageously, the basic control unit is particularly fault-tolerant, and advantageously has an easily comprehensible configuration.

Preferably, the basic control unit and/or the control unit is directly connected with the bus device. The basic control unit is used at startup or reset or upgrade for starting a program running in the control unit, wherein the program can be defined ahead of time in the memory unit or can advantageously be stored with changes permitted.

According to another embodiment, the bus subscriber forming an operating unit applies signals to the enable path, so that the enable path can affect the operating state of a selection of bus subscribers or of individual groups of bus subscribers.

To this end, a logical, encoded or periodic signal or a defined potential is applied to the enable line for enablement, which advantageously simplifies many interactions with the bus subscribers.

Advantageously, with the respective signal of the at least one enable path, the operating state of the corresponding bus subscriber can be switched between an active and a passive and/or optionally also an energy-saving operating state. This enhances the possible selection. Advantageously, the voltage supply of switching elements, for example relays, microprocessors or control units of the individual bus subscribers, can be ensured by using the respective signal of the at least one enable path. This enhances and/or satisfies the first fail-safe requirements.

Preferably, the bus device is implemented as a RS 485 interface with at least one additional enable path, representing a device of high quality and of a high standard, thereby advantageously ensuring interference-free data transmission. The RS 485 interface allows data to be transmitted in half-duplex, which preferably uses a master-slave configuration.

In an alternative embodiment, the bus device is implemented as a CAN-bus with at least one additional enable path.

According to another alternative embodiment, the control paths of the bus device are configured wireless, with the wireless connection implemented as a WLAN, DECT or Bluetooth device.

Alternatively, the enable path can be a component of the control paths of the bus device. This enhances potential applications of the invention.

According to another embodiment, an additional path with signals for mutual identification of the bus subscribers is arranged in addition to the enable path.

In another alternative embodiment, the bus subscribers form a daisy-chain-linking. Linking begins at a predetermined unit, for example the power supply unit, with the linking signal always being set at its output. Each bus subscriber compares the linking signal between its input and its output. If the signal is applied only to the input, then this bus subscriber confers with other bus subscribers, preferably with the master which can be implemented as an operating unit. The master now assigns an address to this bus subscriber which is stored on both devices. Finally, this bus subscriber sets the linking signal at its respective output, which is already queried from the input of another bus subscriber, allowing the other bus subscriber to communicate with the master and having an address assigned by the master.

In a preferred embodiment, each operating unit has a definite intelligence, whereas all other bus subscribers have preferably a standardized intelligence. Accordingly, all control parameters and the control programs and all required data are stored on a memory component of the operating units. The bus device is hence divided in commanding bus subscribers and executing bus subscribers. This has the advantage that all bus subscribers have the same programs, but that the operating units in addition include the program units required for controlling the bus device. This advantageously represents the least complexity when the control program is changed or during programming. The bus device can be later expanded by adding additional bus subscribers, without the need for a separate program.

According to another preferred embodiment, the electrical device arrangement can be controlled by data packets which are transmitted via the bus device, wherein the data packets include at least the address of a bus subscriber as an address byte, a command byte and a check byte. The data packets can have at least one data byte.

In a preferred embodiment, the address byte is structured in several parts. For example, the first four bits can contain information about addressing and additional bits information about the length of a data set. When using four bit information for assigning the address, up to 16 bus subscribers can be arranged on a bus device. A command byte which includes information for controlling a load or a bus subscriber follows. If needed, additional data bytes can be appended which include information, for example, for updates or for programming. The last byte is a check byte representing a checksum of the entire data set. In this way, data sets of variable length can be implemented; however, typical data sets consists of address byte, command byte and check byte. Because of the data sets are very short, data transfer is advantageously reduced to a minimum, resulting in a high degree of reliability and speed.

In a particular preferred embodiment, the bus subscriber which as an operating unit forms a master, has in its memory unit a program segment suitable for forming the control software of the master. By forming a master, additional operating units can advantageously be employed, for example on hospital beds, and operated by patients. In addition, the processor resources are then distributed in the device arrangement in a simple and comprehensible manner.

Preferably, the control units of all or of individual bus subscribers are not supplied with electric power or are not active when the electrical device arrangement is not in use. This advantageously reduces the energy consumption of the arrangement of the invention when not in use, because such device arrangements are most often not in use. In another embodiment, only portions of the individual bus subscribers are active, so that a power-saving sleep mode can be implemented, for example for battery operation.

A method for controlling such electrical device arrangement of the invention, in particular for an item of furniture, with a bus device and bus subscribers has the following method steps:

operating the input unit of a bus subscriber used as operating unit;

classifying this bus subscriber by way of an enable path as a bus subscriber having a master function or as an additional bus subscriber; and controlling the particular bus subscriber addressed by the input unit.

Preferably, during startup, during a reset command or during upgrades, the basic control unit or the control unit of a corresponding bus subscriber exchanges data with the bus subscriber forming the master via the bus device for identification. This provides a device arrangement with a bus device which advantageously is flexible, both with respect to different bus subscribers and also with respect to different applications of items of furniture.

BRIEF DESCRIPTION OF THE DRAWING

Exemplary embodiments of the invention will now be described with reference to the schematic figures of the drawing.

FIG. 3 is an exemplary embodiment of data packets; and

FIG. 4 is a schematic block diagram of a second exemplary embodiment of the arrangement of the invention.

Identical reference symbols in the Figures designate identical or similar components with identical or similar functionality.

FIG. 1 shows a schematic block diagram of a first exemplary embodiment 10 of the arrangement of the invention.

DETAILED DESCRIPTION OF PREFERRED EMBODIMENTS

The device arrangement 10 includes a bus device 11 configured as a RS 485 interface with a data path consisting of two control paths. The bus device 11 also includes at least two power supply paths which provide electric power from a supply unit 12. The supply unit 12 is located at the beginning of the bus device 11.

The bus device also includes an enable path.

Bus subscribers 13 . . . 18 are connected to the bus device 11 at any location, with connection to the data paths, the supply paths and the enable path. The supply unit 12 also forms a bus subscriber.

Figure 1:
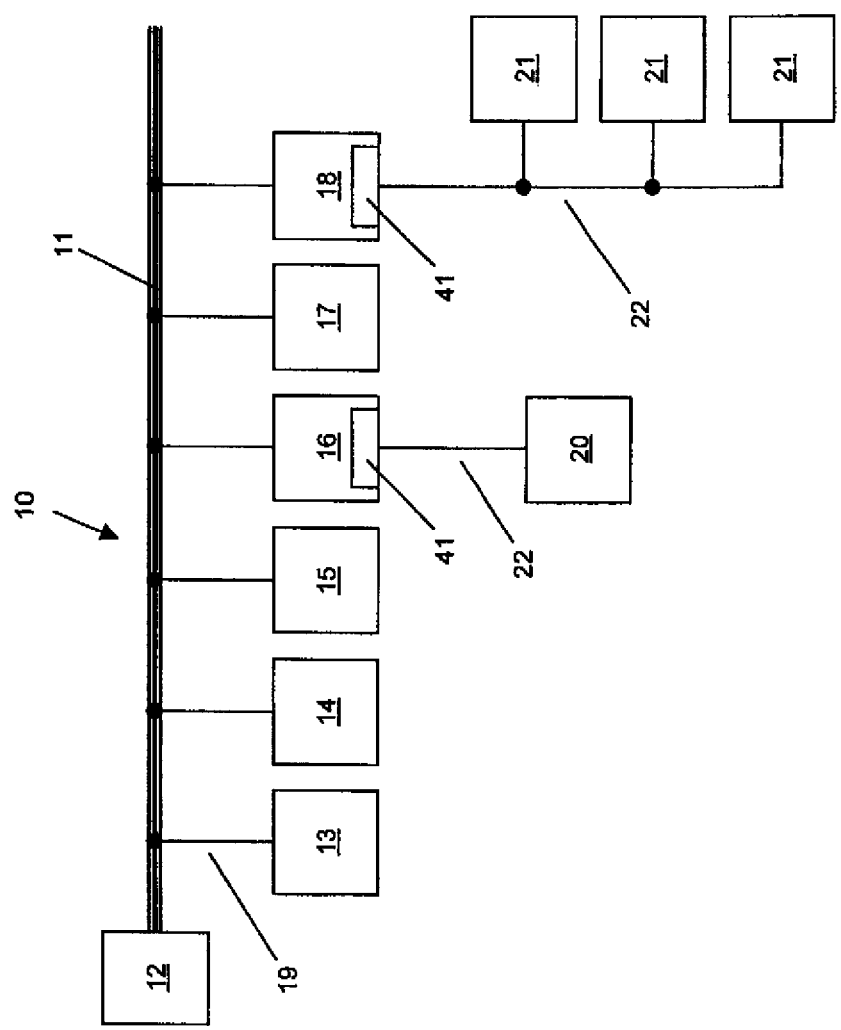
FIG. 1 is a schematic block diagram of a first exemplary embodiment of the arrangement of the invention.

In the example illustrated in FIG. 1 the following bus subscribers 13 . . . 18 are shown: a PC unit 13, a first operating unit 14, a load 15, a first control unit 16, a second operating unit 17, and a second control unit 18.

The device arrangement 10 is only shown in exemplary form and can, for example, be an electrical device arrangement on a hospital bed, which is not illustrated.

The PC unit 13 is here a personal computer supplying data to the data paths of the bus device 11, for example to initially store data in memory units of the bus subscribers for adapting the electrical devices, when the device arrangement 10 is started up or serviced. The data include, for example, tables about the stroke of the drives etc. The programs of individual or of all bus subscribers 13 . . . 18 can be changed, updated or exchanged by using the PC unit 13 or another portable programming device.

The first operating unit 14 is a manual switch used to control all functions of the electrical device arrangement 10. The switch includes input and output functions which will be described below, as well as the control program for the device arrangement. The load 15 in this example is a lamp.

The first controller 16 is provided for a first drive 20, which may be, for example, a dual drive for adjusting a slotted frame of the hospital bed. The controller also includes a power unit 41 which is connected with the first drive 20. Its function will be described below.

A second operating unit 17 is a so-called manual patient switch with limited functionality, i.e., the patient in the hospital bed can only operate those functions of the electrical device arrangement 10 of the hospital bed permitted for that patient, for example the patient can adjust only the head section.

The system can be adapted to the respective patient by replugging the second operating unit or by reprogramming the second operating unit with the PC unit 13. The device arrangement 10 can, of course, be advantageously and easily used also for other items of furniture by eliminating the second operating unit 17.

The second controller 18 also includes a power unit 41 which is connected with second drives 21 which in the exemplary embodiment are separate drives for height adjustment of the bed, which will not described in detail.

The supply unit 12 is also a bus subscriber.

For example, the drives 20, 21 can be synchronized via the bus device 11.

Each bus subscriber 12 . . . 18 is provided with a process controller, as described in more detail below with reference to FIG. 2.

Figure 2:
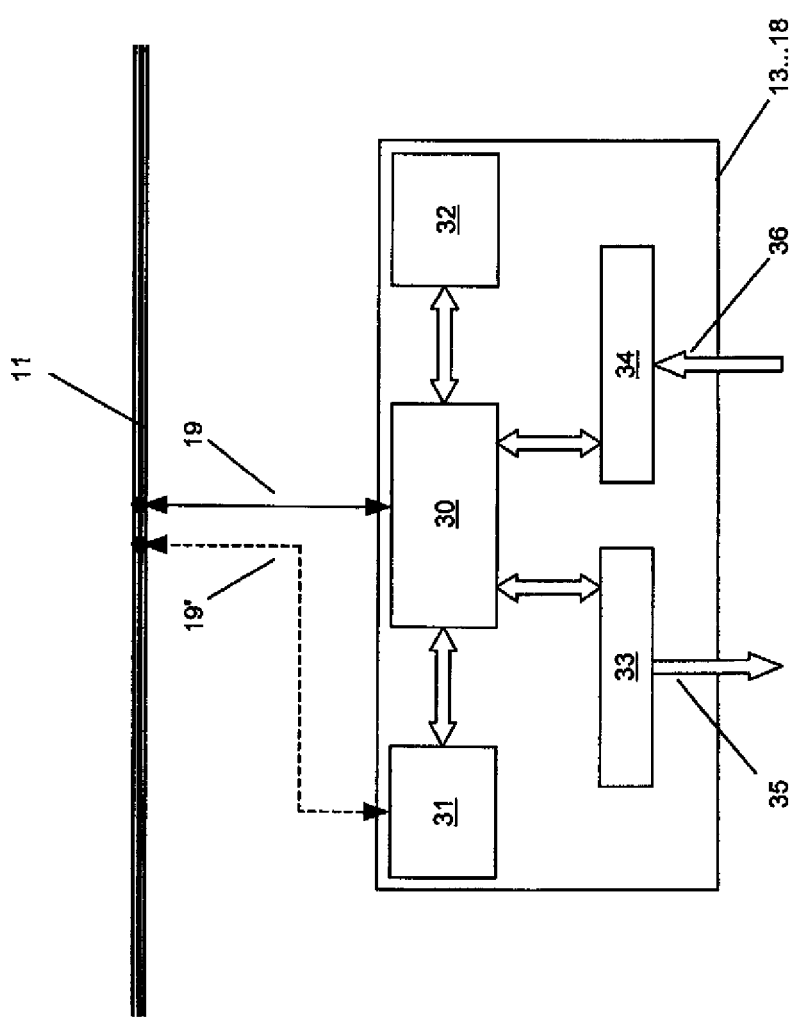
FIG. 2 is a schematic block diagram of an exemplary embodiment of a bus subscriber.

FIG. 2 shows a schematic block diagram of an exemplary embodiment of a bus subscriber 13 . . . 18.

The bus subscriber 13 . . . 18 includes the following: a control unit 30, preferably a processor, a basic control unit 31, a memory unit 32, an output unit 33 with outputs 35, and an input unit 34 with inputs 36.

The control unit 30 is connected with the bus device 11, i.e., with the data paths and power paths and with the enable path. In another embodiment, the basic control unit 31 is directly connected with the bus device 11. The control unit 30 is furthermore connected with the basic control unit 31, the memory unit 32 and the units for output 35 and input 34.

If the bus subscriber is a controller of a drive 20, 21, then the output unit 33 is configured as a power unit 41 with an output 35 for connection to the respective drive 20, 21, which is not described in detail. The input unit 34 is used for receiving control signals from transducers of the drive 20, 21, for example for position measurement.

If the bus subscriber is an operating unit 14, 17, then the input unit 34 is connected with a keyboard. This keyboard can also be a touchscreen or the like. The output unit 33 is, for example, configured for connection to a display screen or indicator lights.

The memory unit 32 includes predefined data values, either individual or in table form, which can still be changed later by the PC unit 13 or automatically during operation. The defined data values are identity information and information about the capability and functionality of the respective bus subscriber.

With respect to the first operating unit 14, the memory unit 32 includes the control program for the device arrangement 10.

When the device arrangement 10 starts up, is serviced, reset, or started again, then the basic control unit 31 takes over the start of the program residing in the memory unit 32 of each bus subscriber 12 . . . 18, and organizes updates/upgrades of the control software of the operating system of the respective bus subscriber 12 . . . 18. The basic control unit 31 is also referred to as BIOS (Basic Input/Output System).

In another embodiment, each operating unit 14, 17 includes a memory unit 32 and a control program for the device arrangement 10.

The control unit 30 checks the data paths for a data set intended for the control unit 30, i.e., the address of the bus subscriber in which the control unit 30 resides. After receipt of such data set (to be described later), the transmitted control command, for example "turn on lamp", is executed. On the drives, the control unit 30 monitors the actual position of the drive and optionally returns data about the position to its control device, in this case the first operating unit 14, via the data paths of the bus device 11, wherein the control device compares the actual position with desired comparison values of the device arrangement and continues to operate the drive, or uses additional control commands to switch the drive off.

The respective bus subscriber 12 . . . 18 can only execute these control commands if the subscriber is enabled via the enable path. To this end, a signal is applied to the enable path, for example by pressing a key, which activates either all bus subscribers 12 . . . 18 or selectively only certain bus subscribers. This can be accomplished with a logical, encoded or periodic signal or with a switching signal or a certain potential. The signal can be monitored, so that, for example, wire breaks can be detected.

In a modification of this embodiment, several enable paths can be provided which can be assigned to different groups of bus subscribers 13 . . . 18. The enable paths can be exclusively integrated in the bus device 10 or can be routed to the individual bus subscribers 13 . . . 18 over a dedicated path.

In another advantageous embodiment, the enable line ensures that voltage is supplied to switching devices, for example relays, microprocessors or control units 30 of the individual bus subscribers 13 . . . 18. Another modification of this embodiment provides an operating unit which is located remote from the operating unit 14, for example, mounted on the bed frame as a switching console with a switch which switches the signal of the enable line.

When a key is pressed on the first operating unit 14, a data packet 50 is applied to the data paths of the bus device 11, as illustrated in FIG. 3. The first operating unit 14 can be defined as the unit that begins operation as the first subscriber on the bus device 10, thereby forming the master.

The data packet 50 in this exemplary embodiment consists of bytes 51-1 to 51-18: an address byte 52 with byte number 53, a control byte 54, data bytes 55, and a check byte 56.

Depending on the transmitted data packet, at least three bytes 52 and 53, 54 and 56 are transmitted. In this exemplary embodiment, the address byte 52 consists of four bits, resulting in at most 16 bus subscribers. In a modification of the illustrated exemplary embodiment, each byte can consist of individual bits or several bytes, so that the bus device can be individually adapted.

The address byte 52 carries the address of the addressed bus subscriber, the byte number represents the number of the bytes 51-1 to 51-18 of the data packet 50, the control byte 54 carries the encoded control command for the corresponding addressed bus subscriber, the data bytes 55 contain the data values to be transmitted, and the check byte 56 is used to check the data packet 50 and can be formed by a checksum, which will not be described in detail. It should be noted that in the exemplary embodiment, the length of the data bytes 55 is formed from the bytes 51-3 to 51-17, having the exemplary indicated byte length of only 15 bytes. The length of the data byte depends on the quantity of the transmitted data as required, for example, during an update.

The startup and initialization of the device arrangement will now be described.

In the illustrated example, bus subscribers having the same properties are used, providing a high degree of flexibility. These have different addresses for identification. To obviate the need for placing encoding switches in the bus subscribers, a daisy-chain-path is employed.

Addresses are assigned at each key activation or setting of the enable path. This has the advantage that the entire system can be checked for complete functionality, and the addition or removal of subscribers is recognized automatically. Preferably, the bus device 11 consists of an RS485 interface with the additional enable path used for signaling, indicating that a master has seized the bus device 11. This path can also be used for network release. The master can also include a power supply with a battery/rechargeable battery. The enable path can also be used to affect the operating states of a respective bus subscriber.

The bus device 11 furthermore has a daisy-chain-path.

The supply unit 12 is always arranged at the beginning of the bus device 11 and sets the daisy-chain-path to a predefined value.

Upon key activation, it is checked if the enable path has a certain signal or potential. If this is not detected, then the bus subscriber where the key was activated becomes the master. The enable path indicates if the master already exists. The bus subscriber then waits to be addressed with its bus address by the existing master. The bus subscriber then stores all addresses with the association of all bus subscribers.

If the bus subscriber is the master, then it sets the enable path to a certain signal, causing all bus subscribers to perform an initialization. The daisy-chain-path is set to a certain value.

All bus subscribers must be operational within a certain time, for example within 10 ms.

The bus subscriber which is connected immediately after the supply unit, has at its daisy-chain-input the defined data value of the supply unit 12. This bus subscriber responds to the address and answers with its own identity and stores the address with which it was addressed. In the exceptional case where the master is that particular bus subscriber, then it assigns the address to itself and sends its identity to the bus device 11 and queries for the next bus subscriber. In this way, all bus subscribers are registered, and the master terminates initialization after receiving the last answer after a certain elapsed time interval of, for example, 10 ms, or if no answer is received, after a preset time interval.

The invention is not limited to the afore-described subject matter, but can be modified in various ways.

For example, in a second exemplary embodiment of the device arrangement 10 of the invention shown in FIG. 4, an electric-motor-driven drive unit 40 can be implemented as a bus subscriber and include the controller 16 with the power unit 41.

The bus device 11 can be configured, for example, as daisy-chain-linking. The bus device 11 can also be implemented as a CAN bus.

The enable path can provide so-called first fail-safety, by switching the enable path directly with a key on the master operating unit 14. If no first fail-safety is required, then the enable path can be switched by a logic circuit or the processor of the master.

The enable path can switch a network release in the supply unit 12, for example, as an additional bus subscriber. Alternatively, the enable path can also switch the bus subscribers between an operating mode and a non-operating mode to save energy.

Moreover, the enable path can affect the control unit 30 or the output 35 such as not to switch the output 35 in the absence of the enable signal, which may prevent an unintentional start up of, for example, a motor of a drive, or turn-on of a load 15, 20, 21, 40. In addition, the control unit 30 of each bus subscriber 13 . . . 18 can deactivate the output 35 after a preset time interval, after which data packets are no longer received.

The control units 31 of the bus subscribers, with the exception of the master, are supplied with energy only following key activation on the master.

It would also be feasible to implement the data paths of the bus device 11 in wireless form, configured for example as a Bluetooth or DECT network similar to a WLAN configuration. In this case, only two lines for supply or power paths to the bus subscribers are required, in particular to drive units and loads, such as lamps, etc. The operating units can then be powered by a battery or rechargeable battery. They can, for example, also be integrated in a mobile telephone.

If at least one bus subscriber 13 . . . 18 is powered by a rechargeable battery, then the signal from the enable line switches the corresponding bus subscriber 13 . . . 18 or at least the control unit 30 between an operating mode and a power-saving sleep mode.

A bus subscriber can also be a sensor.

What is claimed is:

1. An electrical device arrangement of electrical devices of a hospital bed, comprising:
   a bus device having at least two control paths, two power paths and at least one enable path, and
   a plurality of bus subscribers connected to the bus device, wherein one of the plurality of bus subscribers forms an operating unit with an input unit having a keypad, and wherein the at least one enable path is switched by the keypad,
   wherein the one bus subscriber which forms the operating unit applies a signal to the at least one enable path and thereby changes the operating state of a selection of the plurality of bus subscribers or of groups of bus subscribers,
   wherein the applied signal from the at least one enable path switches the operating state of the selection of the plurality of bus subscribers or of the groups of bus subscribers between an active operating state and a passive operating or an energy-saving operating state, wherein the bus device and the bus subscribers are electrical devices of the hospital bed.

2. The electrical device arrangement of claim 1, wherein the bus device comprises at least one daisy-chain-path.

3. The electrical device arrangement of claim 1, wherein the enable path and the daisy-chain path are combined into a single path.

4. The electrical device arrangement of claim 1, wherein each of the plurality of bus subscribers comprises at least one control unit, a basic control unit, a memory unit, and at least one of an output unit and an input unit.

5. The electrical device arrangement of claim 4, wherein at least one of the basic control unit and the at least one control unit is directly connected with the bus device.

6. The electrical device arrangement of claim 4, wherein the memory unit is configured for storing values or programs, or both, which are predefined or adapted to be changed.

7. The electrical device arrangement of claim 1, wherein the applied signal comprises a logical, encoded or periodic signal or a defined potential.

8. The electrical device arrangement of claim 1, wherein the applied signal ensures voltage supply to switching elements of the bus subscribers.

9. The electrical device arrangement of claim 8, wherein the switching elements are selected from the group consisting of relays, microprocessors and control units.

10. The electrical device arrangement of claim 1, wherein the bus device is implemented as a RS 485 interface having at least one additional enable path and at least one further path.

11. The electrical device arrangement of claim 10, wherein the further path is configured for daisy-chain-linking of the bus subscribers.

12. The electrical device arrangement of claim 1, wherein the bus device is implemented as a CAN-bus having at least one additional enable path.

13. The electrical device arrangement of claim 1, wherein the at least two control paths of the bus device are configured as wireless control paths.

14. The electrical device arrangement of claim 13, wherein the wireless control path is implemented by using a WLAN, DECT or Bluetooth device.

15. The electrical device arrangement of claim 1, wherein the enable path is a component of the at least two control paths of the bus device.

16. The electrical device arrangement of claim 1, wherein the bus subscribers are connected in form of a daisy-chain.

17. The electrical device arrangement of claim 1, wherein the bus device transmits data packets controlling the electrical device arrangement, wherein the data packets comprise an address of a bus subscriber in form of an address byte, a command byte and a check byte.

18. The electrical device arrangement of claim 17, wherein the data packets comprise at least one additional data byte.

19. The electrical device arrangement of claim 1, wherein one bus subscriber of the plurality of bus subscribers operates as a master and comprises a memory unit storing a program segment representing control software of the master.

20. The electrical device arrangement of claim 4, wherein electric power is disconnected from the control units of a bus subscriber which is inactive when the electrical device arrangement is not in use.

21. A method for controlling an arrangement of electrical devices of a hospital bed, having a bus device including at least two control paths, two power paths and at least one enable path, and a plurality of bus subscribers connected to the bus device, the method comprising the steps of:
(i) Activating an input unit with a keypad of one of the plurality of bus subscribers, said input unit used as an operating unit;
(ii) Classifying the bus subscriber which forms the operating unit by way of an enable path either as a bus subscriber with master functionality or as an additional bus subscriber;
(iii) Addressing with the input unit a second bus subscriber different from the one bus subscriber or the additional bus subscriber of the plurality of bus subscribers; and
(iv) Controlling a the second bus subscriber, wherein the bus device and the bus subscribers are electrical devices of the hospital bed.

22. The method of claim 21, further comprising the step of exchanging data between a control unit of the second bus subscriber and the one bus subscriber with master functionality via the bus device for identification during startup, during a reset command or during upgrades.

* * * * *